United States Patent
Ichikawa et al.

(10) Patent No.: US 12,385,795 B2
(45) Date of Patent: Aug. 12, 2025

(54) TIRE AIR PRESSURE MONITORING SYSTEM AND TIRE AIR PRESSURE MONITORING PROGRAM

(71) Applicant: BRIDGESTONE CORPORATION, Tokyo (JP)

(72) Inventors: Hiromitsu Ichikawa, Tokyo (JP); Hajime Fukumori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 234 days.

(21) Appl. No.: 18/031,694

(22) PCT Filed: Oct. 7, 2021

(86) PCT No.: PCT/JP2021/037098
§ 371 (c)(1),
(2) Date: Apr. 13, 2023

(87) PCT Pub. No.: WO2022/080221
PCT Pub. Date: Apr. 21, 2022

(65) Prior Publication Data
US 2024/0019328 A1    Jan. 18, 2024

(30) Foreign Application Priority Data

Oct. 16, 2020  (JP) ................... 2020-174380

(51) Int. Cl.
*B60C 23/00* (2006.01)
*B60C 23/04* (2006.01)
(Continued)

(52) U.S. Cl.
CPC .......... *G01L 17/00* (2013.01); *B60C 23/0479* (2013.01); *G01L 19/086* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 8,248,224 B2 * 8/2012 Fujita ................... B60C 23/061
340/444
8,738,308 B2 * 5/2014 Kitano ................ B60C 23/061
73/146
(Continued)

FOREIGN PATENT DOCUMENTS

EP    0 989 001 A2    3/2000
EP    1 092 570 A1    4/2001
(Continued)

OTHER PUBLICATIONS

International Search Report of PCT/JP2021/037098 dated Nov. 22, 2021 [PCT/ISA/210].
(Continued)

*Primary Examiner* — Andre J Allen
(74) *Attorney, Agent, or Firm* — Sughrue Mion, PLLC (57) ABSTRACT

A tire air pressure monitoring system includes: a data acquisition unit that acquires tire air pressure data at each fixed detection period; a storage unit that stores newly acquired air pressure data P(0), and air pressure data P(1) to P(N) acquired 1 to N periods prior to the air pressure data P(0); a determination unit that determines a state in which air pressure has decreased, on the basis of air pressure data; and a communication unit that transmits a determination result of the determination unit to an external device, in which the determination unit compares each piece of the air pressure data P(1) to P(n) with the air pressure data P(0) to calculate decrease values, compares the decrease values with a preset first threshold value (th1), and determines that tire air (Continued)

pressure is decreasing when at least one decrease value is greater than or equal to the first threshold value.

4 Claims, 8 Drawing Sheets

(51) Int. Cl.
*G01L 17/00* (2006.01)
*G01L 19/08* (2006.01)

(58) Field of Classification Search
CPC . B60C 23/0433; B60C 23/0493; B60C 19/00; B60C 23/04; B60C 23/0462; B60C 23/20; B60C 23/041; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/0452; B60C 23/0498; B60C 23/02; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/003; B60C 23/00318; B60C 23/0403; B60C 23/0406; B60C 23/0472; B60C 23/066; B60C 23/00; B60C 23/00372; B60C 29/02; B60C 23/006; B60C 11/00; B60C 23/0454; B60C 23/044; B60C 23/0455; B60C 23/008; B60C 23/0483; B60C 25/002; B60C 23/0461; B60C 23/0474; B60C 23/0489; B60C 23/0491; B60C 29/064; B60C 23/0415; B60C 23/00363; B60C 23/0459; B60C 23/0471; B60C 23/0481; B60C 23/0476; B60C 11/0318; B60C 23/0477; B60C 2200/02; B60C 23/002; B60C 23/0437; B60C 2019/005; B60C 23/042; B60C 23/0405; B60C 23/0422; B60C 23/0423; B60C 23/0466; B60C 13/001; B60C 29/06; B60C 23/0447; B60C 25/132; B60C 23/0427; B60C 23/0449; B60C 9/18; B60C 25/00; B60C 23/065; B60C 23/0484; B60C 23/0486; B60C 19/003; B60C 13/00; B60C 23/00336; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/04; B60C 2200/065; B60C 23/00305; B60C 23/067; B60C 23/131; B60C 23/135; B60C 23/137; B60C 23/18; B60C 25/02; B60C 11/02; B60C 17/009; B60C 19/002; B60C 19/12; B60C 2019/007; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 5/0033; G01M 1/00; G01M 15/044; G01M 17/00; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06; G01L 17/00; G01L 19/086

USPC ................................................. 73/146–146.8
See application file for complete search history.

(56) References Cited

U.S. PATENT DOCUMENTS

| | | | |
|---|---|---|---|
| 12,128,715 B2 * | 10/2024 | Ozono | ................ B60C 23/0474 |
| 2006/0047469 A1 | 3/2006 | Fabre et al. | |
| 2012/0197551 A1 * | 8/2012 | Kitano | .................. B60C 23/061 |
| | | | 702/50 |
| 2015/0091720 A1 | 4/2015 | Graf et al. | |
| 2017/0368893 A1 | 12/2017 | Kodama et al. | |
| 2024/0326523 A1 * | 10/2024 | Matsuda | ............. B60C 23/0477 |

FOREIGN PATENT DOCUMENTS

| | | | | |
|---|---|---|---|---|
| EP | 1798077 B1 * | 5/2014 | ........... B60C 23/061 |
| JP | 2006-71642 A | 3/2006 | |
| JP | 2006-168457 A | 6/2006 | |
| JP | 2007331752 A * | 12/2007 | ........... B60C 23/061 |
| JP | 2012-171463 A | 9/2012 | |
| JP | 2012-171464 A | 9/2012 | |
| JP | 2017-87941 A | 5/2017 | |
| WO | 2008/007531 A1 | 1/2008 | |
| WO | 2016/103453 A1 | 6/2016 | |

OTHER PUBLICATIONS

Extended European Search Report dated Feb. 23, 2024, issued in European Application No. 21879961.7.

* cited by examiner

TIRE AIR PRESSURE MONITORING SYSTEM AND TIRE AIR PRESSURE MONITORING PROGRAM

CROSS REFERENCE TO RELATED APPLICATIONS

This application is a National Stage of International Application No. PCT/JP2021/037098 filed on Oct. 7, 2021, claiming priority based on Japanese Patent Application No. 2020-174380 filed on Oct. 16, 2020.

TECHNICAL FIELD

The present invention relates to a tire air pressure monitoring system and a tire air pressure monitoring program that monitor the air pressure of a pneumatic tire.

BACKGROUND ART

Various technologies have been proposed for detecting and providing notification (warning) of a decrease in tire air pressure.

In particular, a technology has been proposed to more reliably provide notification of a decrease in tire air pressure on the basis of a warning threshold value that follows changes in air pressure within a tire as a vehicle travels (Patent Literature 1).

CITATION LIST

Patent Literature

Patent Literature 1: Japanese Unexamined Patent Application Publication No. 2012-171463

SUMMARY OF THE INVENTION

Here, in the technology for providing notification of a decrease in tire air pressure according to the related art, when the value of the air pressure value in a fixed period has decreased by a certain proportion or more, it is determined that the tire air pressure has decreased.

However, in the related art, there has been a problem in that it is difficult to detect a decrease in air pressure when the tire air pressure detection period is short and the rate of decrease in air pressure is gradual.

Thus, the present invention has been made in view of the above problem, and an object of the present invention is to provide a tire air pressure monitoring system and a tire air pressure monitoring program that can accurately detect a decrease in air pressure even when the tire air pressure detection period is short or when the rate of decrease in air pressure is gradual.

A tire air pressure monitoring system (S1$a$) according to an aspect of the present invention includes: a data acquisition unit that acquires tire air pressure data at each fixed detection period; a storage unit that stores newly acquired air pressure data P(0), and air pressure data P(1) to P(N) acquired 1 to N periods prior to the air pressure data P(0) (where N is a natural number of 2 or more); a determination unit that determines a state in which air pressure has decreased, on the basis of the air pressure data; and a communication unit that transmits a determination result of the determination unit to an external device, in which the determination unit compares each piece of the air pressure data P(1) to P(n) (where n is a natural number from 1 to N) with the air pressure data P(0) to calculate decrease values, compares the decrease values with a preset first threshold value, and determines that tire air pressure is decreasing when at least one decrease value is greater than or equal to the first threshold value.

According to such a configuration, it becomes possible to accurately detect a decrease in air pressure even when the tire air pressure detection period is short or when there is a slow leak in which the rate of decrease in air pressure is gradual.

A tire air pressure monitoring system. (S1$b$) according to another aspect of the present invention includes: a data acquisition unit that acquires tire air pressure data at each fixed detection period; a storage unit that stores newly acquired air pressure data. P(0), and data P(1) to P(N) acquired 1 to N periods prior to the air pressure data P(0) (where N is a natural number of 2 or more); a determination unit that determines a state in which air pressure has decreased, on the basis of the air pressure data; and a communication unit that transmits a determination result of the determination unit to an external device, in which, in a case where the determination unit has determined that tire air pressure is decreasing according to a decrease value between air pressure data P(k) (where k is a natural number from 1 to N) and the air pressure data P(0), when all pieces of the air pressure data P(k+1) to P(N) are greater than a sum of the air pressure data P(0) and a preset second threshold value, it is determined that the tire air pressure is decreasing.

According to such a configuration, it becomes possible to suppress the effect of a temporary decrease in pressure such as when a tire has ridden up a curb, and more accurately detect a decrease in air pressure.

Furthermore, it is also possible to implement a configuration in which, in a case where the determination unit has determined that the tire air pressure is decreasing according to a decrease value between the air pressure data P(k) and the air pressure data P(0), with regard to hypothetical air pressure data P' when it is assumed that air pressure has decreased by a certain proportion from the air pressure data P(k) to P(0), when air pressure data. P(k−1) to P(1) and the hypothetical air pressure data P'(k−1) to P'(1) are compared in a same period and all are within a certain range, it is determined that the tire air pressure is decreasing.

In this case, it becomes possible to prevent erroneous determination, and more accurately detect a decrease in air pressure.

Furthermore, a tire air pressure monitoring program executed by a computer provided in a tire air pressure monitoring system according to another aspect of the present invention includes: a step of acquiring tire air pressure data at each fixed detection period; a step of storing newly acquired air pressure data P(0), and air pressure data P(1) to P(N) acquired 1 to N periods prior to the air pressure data P(0) (where N is a natural number of 2 or more); a step of determining a state in which air pressure has decreased, on the basis of the air pressure data; and a step of transmitting a determination result to an external device, in which, in the step of determining the state in which air pressure has decreased, each piece of the air pressure data P(1) to P(n) (where n is a natural number from 1 to N) is compared with the air pressure data P(0) to calculate decrease values, the decrease values are compared with a preset first threshold value, and it is determined that tire air pressure is decreasing when as least one decrease value is greater than or equal to the first threshold value.

According to such a configuration, it becomes possible to accurately detect a decrease in air pressure even when the tire air pressure detection period is short or when there is a slow leak in which the rate of decrease in air pressure is gradual.

Furthermore, a tire air pressure monitoring program executed by a computer provided in a tire air pressure monitoring system according to another aspect of the present invention includes: a step of acquiring tire air pressure data at each fixed detection period; a step of storing newly acquired air pressure data P(0), and air pressure data P(1) to P(N) acquired 1 to N periods prior to the air pressure data P(0) (where N is a natural number of 2 or more); a step of determining a state in which air pressure has decreased, on the basis of the air pressure data; and a step of transmitting a determination result to an external device, in which, in the step of determining the state in which air pressure has decreased, in a case where it is determined that tire air pressure is decreasing according to a decrease value between air pressure data P(k) (where k is a natural number from 1 so N) and the air pressure data P(0), when all pieces of the air pressure data P(k+1) to P(N) are greater than a sum of the air pressure data P(0) and a preset second threshold value, it is determined that the tire air pressure is decreasing.

According thereto, it becomes possible to suppress the effect of a temporary decrease in pressure such as when a tire has ridden up a curb, and more accurately detect a decrease in air pressure.

Furthermore, in the step of determining the state in which air pressure has decreased, in a case where it is determined that the tire air pressure is decreasing according to a decrease value between the air pressure data P(k) and the air pressure data P(0), with regard to hypothetical air pressure data P' when it is assumed that air pressure has decreased by a certain proportion from the air pressure data P(k) to P(0), when air pressure data P(k−1) to P(1) and the hypothetical air pressure data P'(k−1) to P'(1) are compared in a same period and all are within a certain range, it may be determined that the tire air pressure is decreasing.

In this case, it becomes possible to prevent erroneous determination, and more accurately detect a decrease in air pressure.

According to the embodiments herein, it is possible to provide a tire air pressure monitoring system and a tire air pressure monitoring program which can accurately detect a decrease in air pressure even when the tire air pressure detection period is short or when the rate of decrease in air pressure is gradual.

DESCRIPTION OF EMBODIMENTS

First Embodiment

A tire air pressure monitoring system S1a according to a first embodiment of the present invention will be described with reference to FIGS. 1 to 3.

Note that the same or similar portions are denoted by the same or similar reference numerals in the following descriptions of the drawings. However, it should be noted that the drawings are schematic and ratios of dimensions and the like are different from those in reality.

Accordingly, specific dimensions and the like should be determined in consideration of the following descriptions. Furthermore, the drawings include portions having dimensional relationships and ratios that are different from each other, as a matter of course.

(Schematic Configuration of Tire Air Pressure Monitoring System)

Figure 1:
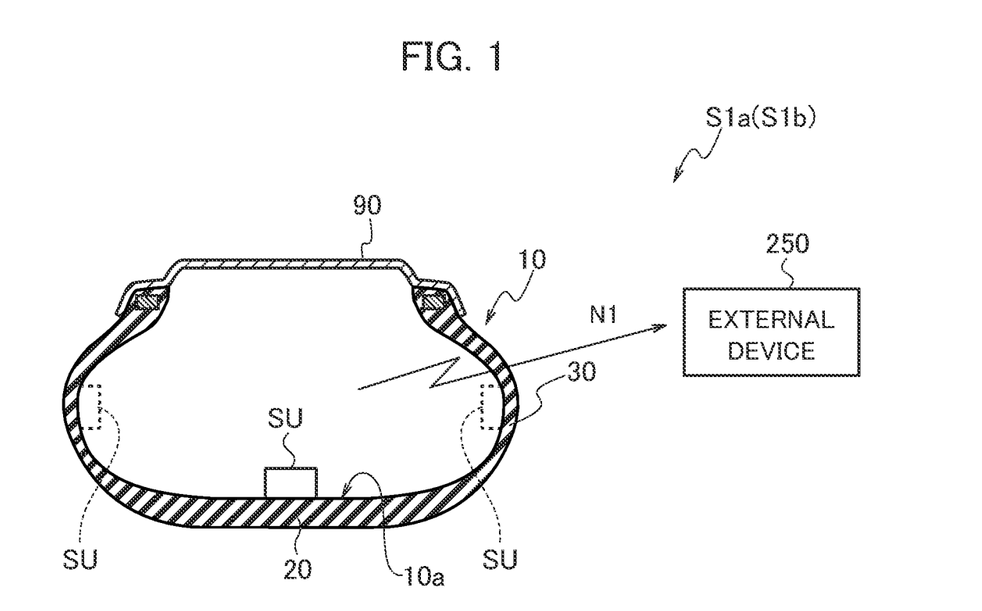
FIG. 1 is a schematic configuration diagram illustrating a schematic configuration of a tire air pressure monitoring system according to a first embodiment.

A schematic configuration of the tire air pressure monitoring system S1a according to the first embodiment will be describes with reference to the schematic configuration diagram of FIG. 1.

The tire air pressure monitoring system S1a includes a sensor unit SU provided on a pneumatic tire (hereafter referred to simply as a tire) 10 side.

FIG. 1 illustrates a cross-sectional shape along a tire width direction of a tire 10 mounted on a rim wheel 90.

Furthermore, a tread portion 20 is a portion where the tire 10 attached to a vehicle, which is not illustrated, comes into contact with a road surface when rolling on the road surface. A tread pattern corresponding to the type of vehicle and the required performance is formed in the tread portion 20.

The sensor unit SU, which detects internal pressure information of the tire 10, is provided on an inner surface 10a of the tire 10 to which the tire air pressure monitoring system S1a can be applied. Although not directly related to the present embodiment, note that the sensor unit SU may be capable of acquiring temperature information and the like.

In the configuration example illustrated in FIG. 1, the sensor unit SU is provided on the inner surface 10a facing the tread portion 20. More specifically, the sensor unit SU is attached to the surface of an inner liner (not illustrated) that prevents leakage of gases such as air filled in the internal space of the pneumatic tire 10 mounted on the rim wheel 90.

Note that the sensor unit SU is not limited to the inner surface 10a facing the tread portion 20, and may be provided on an inner surface at a sidewall 30 side of the tire 10.

The sensor unit SU is preferably provided on each tire 10 attached to the vehicle. This is because it is desirable to monitor the leak situation or the like of each tire 10 so as to ensure the safety of the vehicle.

In addition, the sensor unit SU need not necessarily be attached to the inner side surface of the tire 10. For example, a configuration may be adopted in which a part or all of the sensor unit SU is embedded inside the tire 10.

Furthermore, the sensor unit SU may be attached to the wheel to which the tire 10 is attached.

(Functional Configuration of Tire Air Pressure Monitoring System)

Figure 2:
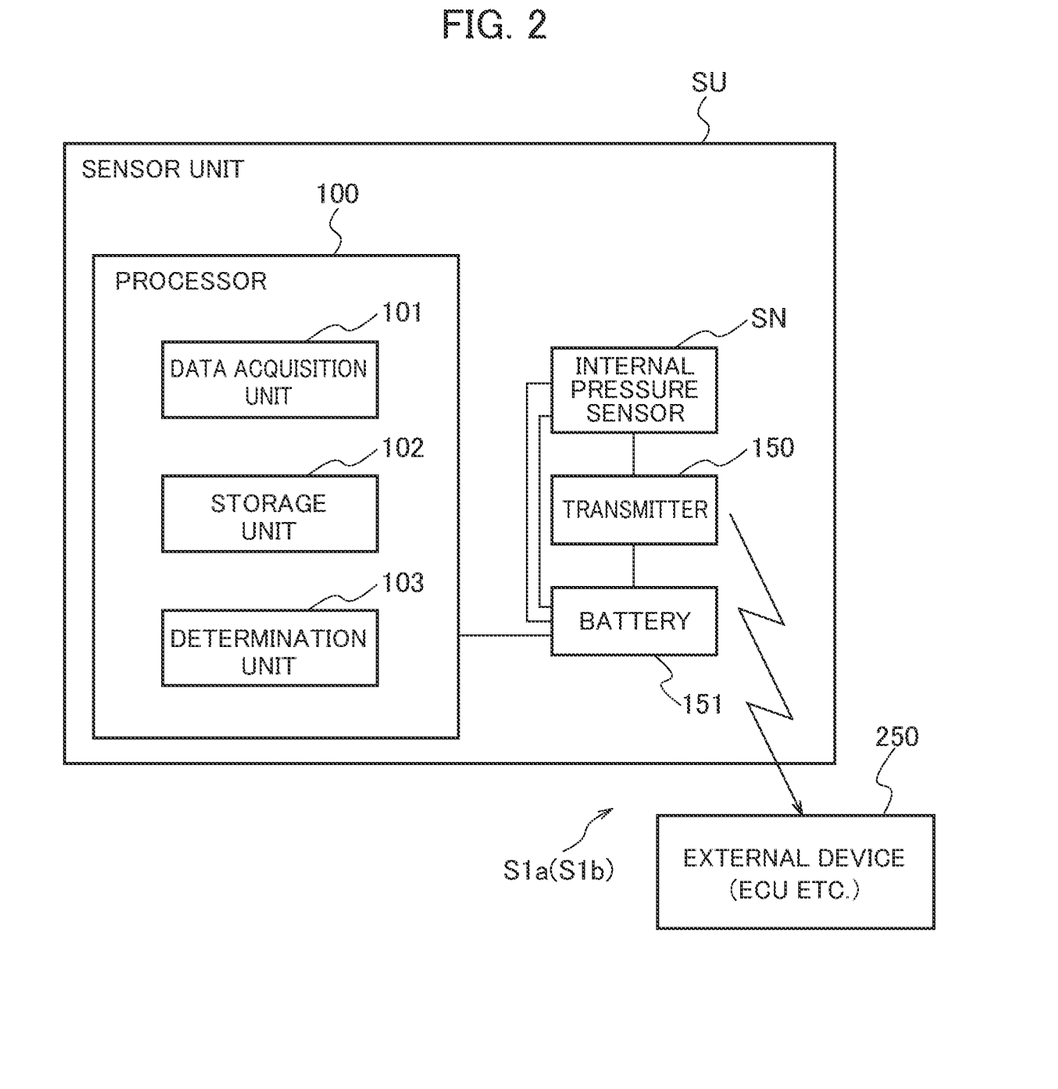
FIG. 2 is a functional block diagram illustrating a functional configuration of the tire air pressure monitoring system according to the first embodiment.
Figure 3:
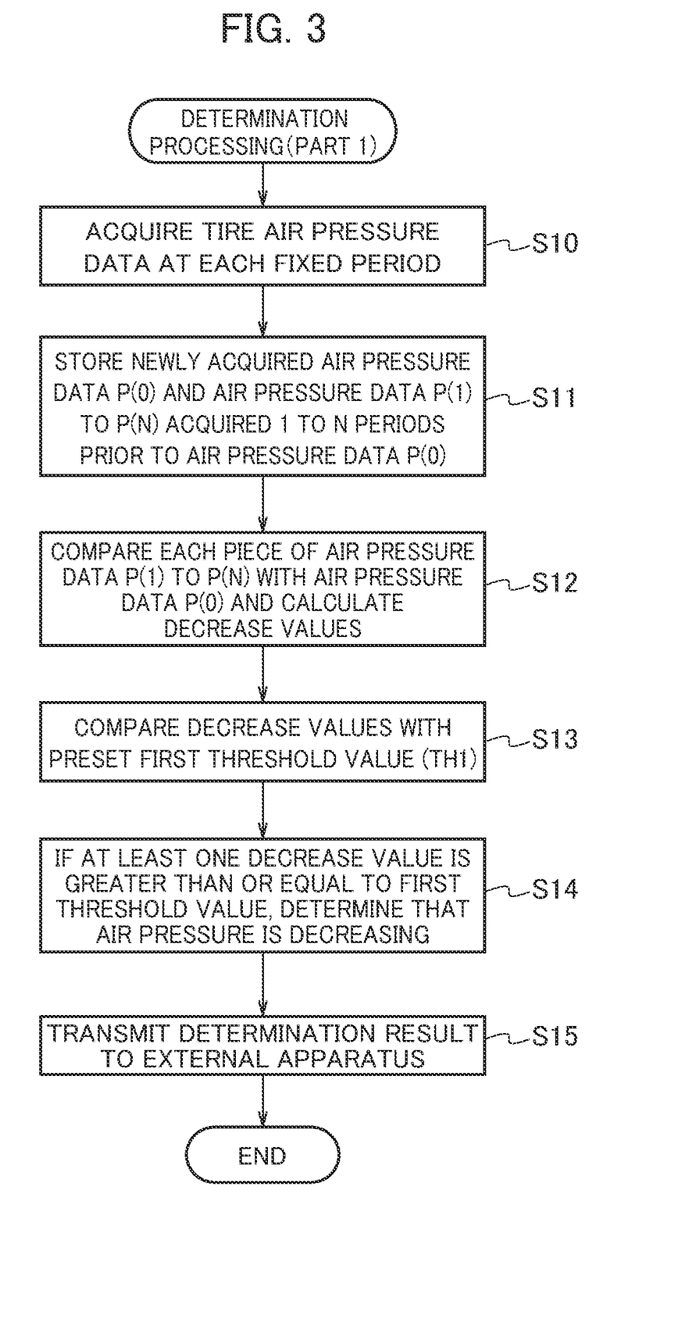
FIG. 3 is a flow chart illustrating a processing procedure for determination processing (part 1) executed by the tire air pressure monitoring system according to the first embodiment.

As illustrated in the functional block diagram of FIG. 2, the sensor unit SC includes an internal pressure sensor SN that detects internal pressure (air pressure) of the tire a transmitter 150 that transmits detection data at each fixed detection period (for example, 12 sec, 30 sec, 60 sec, or the like) to an external device (in-vehicle device (ECU) or the like), a processor 100, and a battery 151 that feeds the internal pressure sensor SN, the processor 100, and the transmitter 150.

By providing the processor 100 in the sensor unit SU, it is possible to determine a state in which air pressure has decreased, in a manner that is well-balanced with processing efficiency without increasing the frequency of transmitting data for which power consumption is high.

The processor 100 is provided with a storage unit 102 configured of a flash memory or the like that stores newly acquired air pressure data P(0), and air pressure data P(1) to P(N) acquired 1 to N periods prior to the air pressure data P(0) (where N is a natural number of 2 or more).

Note that "N" in P(N) can be 3 to 5. It is thereby possible to achieve balance between handling a gradual leak in air pressure and processing efficiency.

In addition, the processor 100 is provided with a determination unit 103 configured of a CPU or the like that determines a state in which air pressure has decreased, on the basis of the air pressure data.

Furthermore, the transmitter 150 transmits the determination result of the determination unit 103 to an external device 250 such as an ECU, via a communication line N1.

Here, the determination unit 103 compares each piece of the air pressure data P(1) to P(n) (where n is a natural number from 1 to N) with the air pressure data P(0) to calculate decrease values.

Next, the decrease values are compared with a preset first threshold value th1, and when at least one decrease value is greater than or equal to the first threshold value th1, it is determined that the tire air pressure is decreasing.

It is thereby possible to accurately detect a decrease in air pressure even when the tire air pressure detection period is short or when there is a slow leak in which the rate of decrease in air pressure is gradual.

Note that an example of determination processing that realizes the aforementioned processing described hereinafter.

(Determination Processing (Part 1))

The processing procedure for the determination processing (part 1) executed by the tire air pressure monitoring system S1*a* will be described with reference to the flowchart illustrated in FIG. 3.

When this processing is started, in step S10, tire air pressure data is acquired at each fixed detection period, and the processing moves to step S11.

In step S11, newly acquired air pressure data P(0) and air pressure data P(1) to P(N) acquired 1 to N periods prior to the air pressure data P(0) (where N is a natural number of 2 or more) are stored by the storage unit 102, and the processing moves to step S12.

In step S12, each piece of the air pressure data P(1) to P(n) (where n is a natural number from 1 to N) is compared with the air pressure data P(0) to calculate decrease values (for example, P(0)−P(1) and de like), and de processing moves to step S13.

In step S13, a comparison is made with a preset first threshold value (th1), and the processing moves to step S14.

Here, the first threshold value th1 is a threshold value for an LSB difference of the sensor that is considered to have a significant difference, taking into account errors of a sensor element constituting the internal pressure sensor SN. Furthermore, it is understood that when there is a decrease greater than or equal to the first threshold value th1, a sudden decrease in internal pressure can be determined.

The first threshold value th1 depends on the measurement period, and can be 3 LSB (approximately 3 to 10 kPa) in 30 sec or less, or 4 LSB (approximately 5 to 15 kPa) in 60 sec, for example.

In step S14, if at least one decrease value is greater than or equal to the first threshold value (th1) (in other words, for example, if P(0)−P(1)≥th1 or the like), it is determined that the tire air pressure is decreasing, and the processing moves to step S15.

In step S15, the determination result is transmitted to the external apparatus (ECU or the like) 250, and the processing ends.

It is thereby possible to accurately detect a decrease in air pressure even when the tire air pressure detection period is short or when there is a slow leak in which the rate of decrease in air pressure is gradual.

Second Embodiment

A tire air press monitoring system S1*b* according to a second embodiment of the present invention will be described with reference to FIGS. 1, 2, 4A, 4B, and 5.

Here, the functional configuration and the like of the tire air pressure monitoring system S1*b* according to the second embodiment are the same as chose of the tire air pressure monitoring system S1*a* according to the first embodiment, and therefore duplicate descriptions are omitted.

In the tire air pressure monitoring system S1*b*, in a case where the determination unit 103 has determined that the tire air pressure is decreasing according to a decrease value between air pressure data P(k) (where k is a natural number from 1 to N) and the air pressure data P(0), when all pieces of the air pressure data P(k+1) to P (N) are greater than the sum of the air pressure data P(0) and a preset second threshold value, it is determined that the tire air pressure is decreasing.

It thereby becomes possible to suppress the effect of a temporary decrease in pressure such as when the tire has ridden up a curb, and more accurately detect a decrease in air pressure.

Furthermore, in a case where the determination unit 103 has determined that the tire air pressure is decreasing according to a decrease value between air pressure data P(k) and the air pressure data P(0), with regard to hypothetical air pressure data P' when it is assumed that air pressure has decreased by a certain proportion from the air pressure data P(k) to P(0), when air pressure data P(k−1) to P(1) and the hypothetical air pressure data P'(k−1) to P'(1) are compared in the same period and all are within a certain range, it can be determined that the tire air pressure is decreasing.

In this case, it becomes possible to prevent erroneous determination, and more accurately detect a decrease in air pressure.

(Determination Processing (Part 2))

Figure 4A:
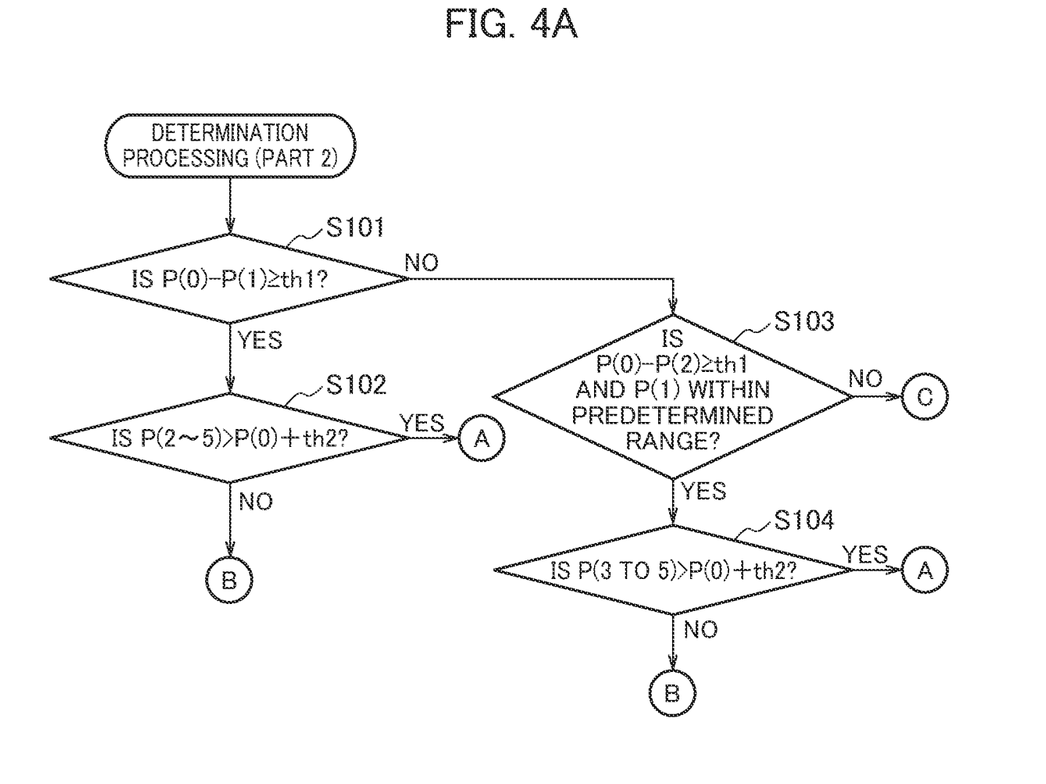
FIG. 4A is a flow chart illustrating a processing procedure for determination processing (part 2) executed by a tire air pressure monitoring system according to a second embodiment.
Figure 4B:
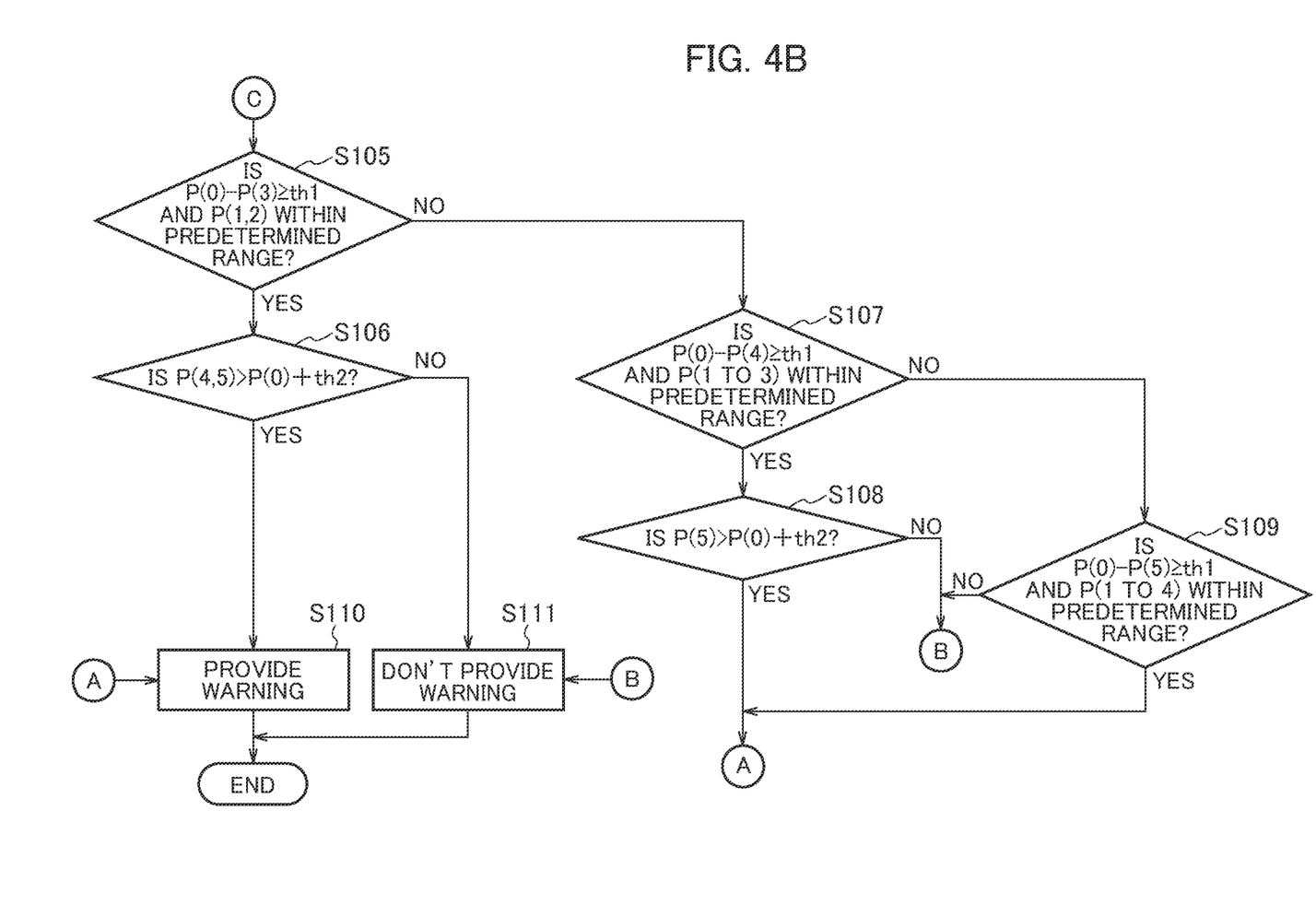
FIG. 4B is a flow chart illustrating the continuation of the processing procedure for determination processing (part 2) executed by the tire air pressure monitoring system according to the second embodiment.

The processing procedure for the determination processing (part 2) executed by the tire air pressure monitoring system S1*b* will be described with reference to the flowcharts illustrated in FIGS. 4A and 4B.

This determination processing, in addition to detecting a decrease in air pressure such as when there is a gradual leak in air pressure, makes it possible to more reliably provide notification (warning) of a decrease in air pressure by suppressing the effect of a temporary decrease in pressure such as when the tire has ridden up a curb.

More specifically, when determining a state in which air pressure has decreased, in a case where the tire air pressure is decreasing according to a decrease value between air pressure data P(k) (where k is a natural number from 1 to N) and the air pressure data P(0), and all pieces of air pressure data P(k+1) to P(N) are greater than the sum of the air pressure data P(0) and the preset second threshold value (th2), it is determined that the tire air pressure is decreasing.

When this processing is started, in step S101, it is determined whether or not P(0)−P(1)≥th1.

More specifically, the same processing as that in steps S10 to S15 in the aforementioned determination processing (part 1) is executed.

Then, if it is determined that the air pressure is decreasing (if "Yes"), the processing moves to S102.

In step S102, it is determined whether or not P(2 to 5)>P(0)+th2.

Here, the second threshold value th2 is an upper limit for errors of the sensor element constituting the internal pressure sensor SN, and can be a value that is approximately twice the error LSB relative to the actual value (in other words, the maximum difference LSP between measurement samples when there is no change in pressure).

Note that the second threshold value th2 can be approximately 5 to 10 kPa, for example.

Then, if the determination result of step S102 is "No", the processing moves to step S111, and the processing ends without a warning being provided.

Furthermore, if the determination result is "Yes", the processing moves to step S110, a warning is provided that there has been a sudden decrease in tire pressure due to the tire riding up a curb or the like, and the processing ends.

However, if "No" is determined in step S101, the processing moves to step S103.

In step S103, it is determined whether or not P(0)−P(2) ≥th1 and P(1) is within a predetermined range.

Figure 5:
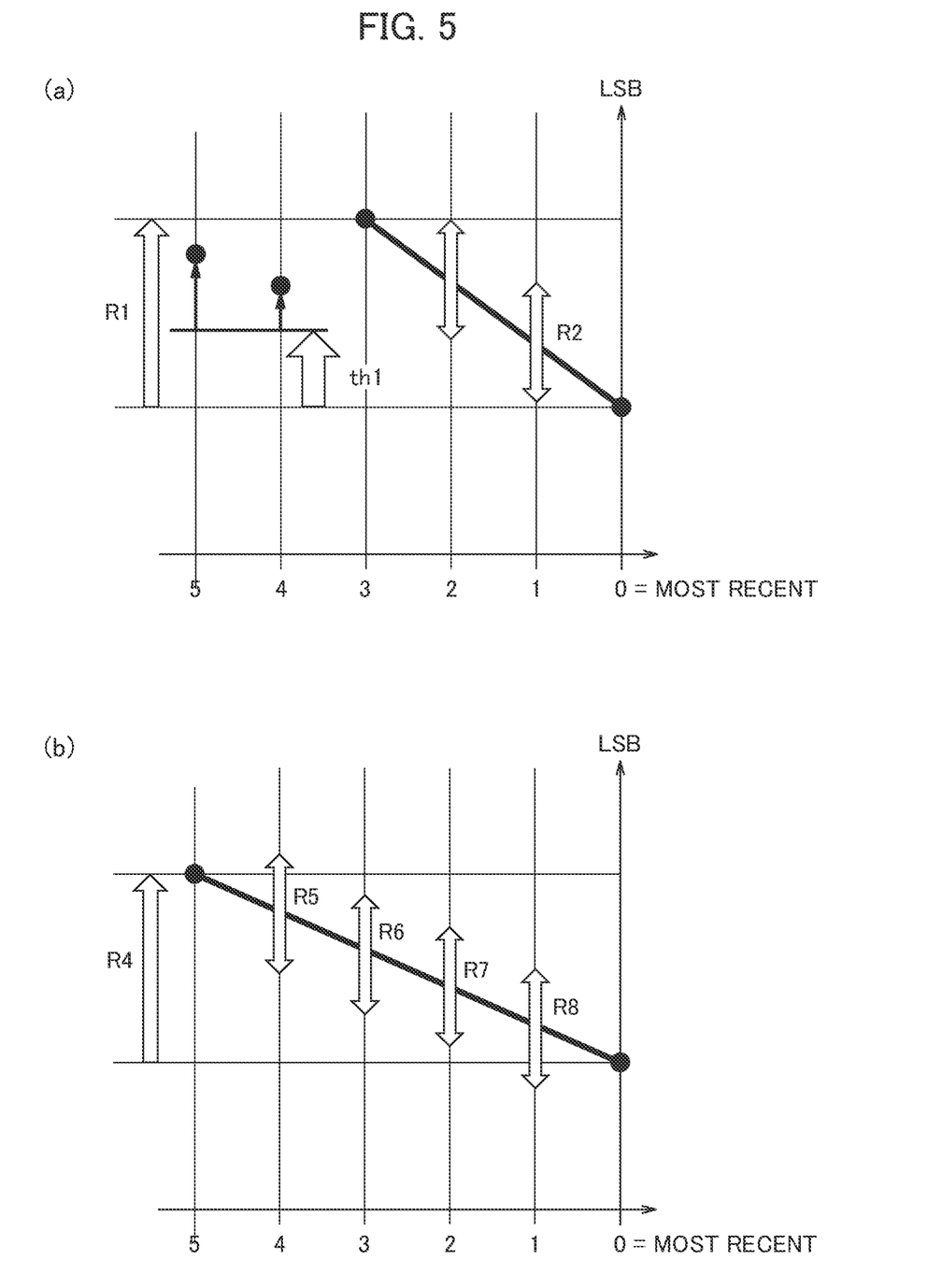
FIG. 5 consists of graphs (a) and (b) supplementing the processing content of the determination processing (part 2).

Here, P(0)−P(2)≥th1 refers to a case such as being in the range R1 (>th1) in the graph (vertical axis: LSB, horizontal axis: measurement period) illustrated in FIG. 5(a), for example.

Furthermore, P(1) being within a predetermined range refers to a case such as P(1) being within the range P2 in the graph illustrated in FIG. 5(a), for example.

Then, if "Yes" is determined in step S103, the processing moves to step S104.

In step S104, it is determined whether or not P(3 to 5)>P(0)+th2.

If the determination result is "No", the processing moves no step S111, and the processing ends without a warning being provided.

Furthermore, if the determination result is "Yes", the processing moves to step S110, a warning is provided that there has been a sudden decrease in tire pressure due to the tire riding up a curb or the like, and the processing ends.

However, if "No" is determined in step S103, the processing moves to step S105.

In step S105, it is determined whether or not P(0)−P(3) ≥th1 and P(1, 2) are within a predetermined range.

Here, P(0)−P(3)≥th1 refers to a case such as being within the range R4 in the graph (vertical axis: LSB, horizontal axis: measurement period) illustrated in FIG. 5(b), for example.

Furthermore, P(1, 2) being within a predetermined range refers to a case such as P(1, 2) being within the range R8 or R7 in the graph illustrated in FIG. 5(b), for example.

Then, if "Yes" is determined in step S105, the processing moves to step S106.

In step S106, it is determined whether or not P(4, 5)>P(0)+th2.

If the determination result is "No", the processing moves to step, S111, and the processing ends without a warning being provided.

Furthermore, if the determination result is "Yes", the processing moves to step S110, a warning is provided that there has been a sudden decrease in tire pressure due to the tire riding up a curb or the like, and the processing ends.

However, if "No" is determined in step S105, the processing moves to step S107.

In step S107, it is determined whether or not P(0)−P(4) ≥th1 and P(1 to 3) are within a predetermined range.

Here, P(0)−P(4)≥th1 refers to a case such as being within the range R4 in the graph illustrated in FIG. 5(b), for example.

Furthermore, P(1 to 3) being within a predetermined range refers to a case such as P(1 to 3) being within the ranges R6 to R8 in the graph illustrated in FIG. 5(b), for example.

Then, if the determination result in step S107 is "Yes", the processing moves to step S108.

In step S108, it is determined whether or not P(5)>P(0)+ th2.

If the determination result is "No", the processing moves to step S111, and the processing ends without a warning being provided.

Furthermore, if the determination result is "Yes", the processing moves to step S110, a warning provided that there has been a sudden decrease in tire pressure due to the tire riding up a curb or the like, and the processing ends.

However, if "No" is determined in step S107, the processing moves to step S109.

In step S109, it is determined whether or not P(0)−P(5) ≥th1 and P(1 to 4) are within a predetermined range.

Here, P(0)−P(5)≥th1 refers to a case such as being within the range R4 in the graph illustrated in FIG. 5(b), for example.

Furthermore, P(1 to 4) being within a predetermined range refers to a case such as P(1 to 4) being within the ranges R5 to R8 in the graph illustrated in FIG. 5(b), for example.

Then, if the determination result is "No", the processing moves to step S111, and the processing ends without a warning being provided.

Furthermore, if the determination result is "Yes", the processing moves to step S110, a warning is provided that these has been a sudden decrease in tire pressure due to the tire riding up a curb or the like, and the processing ends.

As described above, according to this processing, it is possible to detect a decrease in pressure even when there is a gradual leak in the air pressure of the tire 10.

Furthermore, it becomes possible to suppress the effect of a temporary decrease in pressure such as when the tire 10 has ridden up a curb, and more accurately detect a decrease in air pressure.

Furthermore, there is also the merit that it becomes possible to prevent erroneous determinations, and more accurately detect a decrease in air pressure.

In addition, it is also possible to obtain the effect of it becoming possible to accurately detect a decrease in air pressure even when the tire air pressure detection period is short or when there is a slow leak in which the rate of decrease in air pressure is gradual.

(Determination Processing (Part 3))

Figure 6:
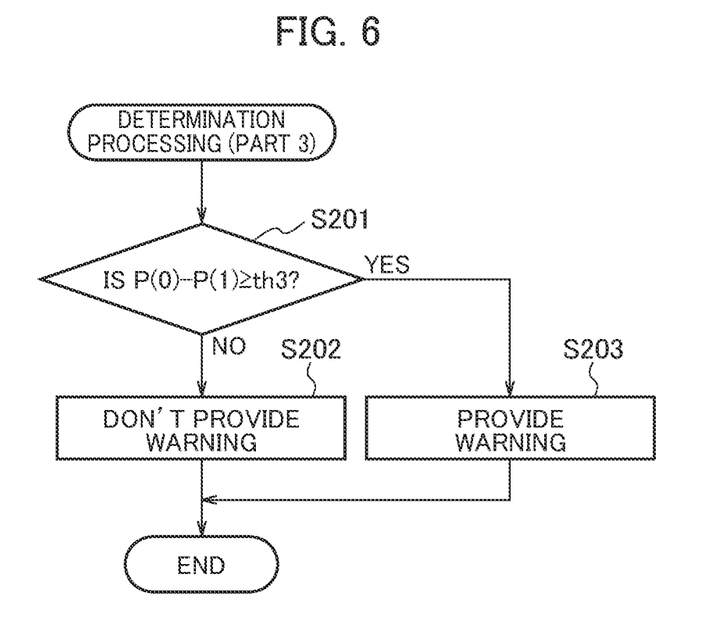
FIG. 6 is a flowchart illustrating a processing procedure for determination processing (part 3).

The processing procedure for the determination processing (part 3) executed by the tire air pressure monitoring system S1a (S1b) will be described with reference to the flowchart illustrated in FIG. 6.

When this processing is started, in step S201, it is determined whether or not $P(0)-P(1) \geq th3$. Here, $P(0)$ is newly acquired air pressure data, $P(1)$ is air pressure data acquired one period before, and th3 is a preset third threshold value.

The third threshold value th3 is a threshold value for an LSB difference of the internal pressure sensor SN at which a sudden decrease will surely occur even when the tire has ridden up a curb or the like. Furthermore, it is understood that when there is a decrease greater than or equal to the third threshold value th3, a sudden decrease in internal pressure can be determined.

The third threshold value th3 can be approximately 10 to 30 kPa, for example.

Then, if the determination result is "Yes", the processing moves to step S202. In step S202, a warning such as "The tire pressure is decreasing. Please perform tire maintenance." is notified to the driver or the like, and the processing ends.

It thereby becomes possible to more reliably provide notification of a decrease in tire air pressure. In particular, it becomes possible to accurately detect and provide notification of a decrease in air pressure even when the tire air pressure detection period is short or when there is a slow leak in which the rate of decrease in air pressure is gradual.

However, if "No" is determined in step S201, the processing moves to step S203, and the processing ends without a warning being provided.

It is thereby possible to detect and provide notification (warning) of a burst tire 10 or the like.

Note that the determination unit 103 illustrated in FIG. 2 may be implemented such that the air pressure data $P(1)$ and $P(0)$ are compared and a decrease values is calculated, the decrease value is compared with the third threshold value th3, and it is determined that the tire air pressure is decreasing when the decrease value is greater than or equal to the third threshold value th3.

It thereby becomes possible to detect, at an early stage, a decrease in pressure that is greater than or equal to a certain threshold value such as that of a burst tire.

As described above, the tire air pressure monitoring program in which determination processing is executed can have: a step of acquiring tire air pressure data at each fixed detection period; a step of storing newly acquired air pressure data $P(0)$, and air pressure data $P(1)$ to $P(N)$ that is acquired 1 to N periods prior to the air pressure data $P(0)$ (where N is a natural number of 2 or more); a step of determining a state in which air pressure has decreased, on the basis of the air pressure data; and a step of transmitting a determination result to the external device (ECU or the like) 250.

Also, in the step of determining a state in which air pressure has decreased, it is possible to compare each piece of air pressure data $P(1)$ to $P(n)$ (where n is a natural number from 1 to N) with the air pressure data $P(0)$ to calculate decrease values, compare the decrease values with the preset first threshold value th1, and determine that the tire air pressure is decreasing when at least one decrease value is greater than or equal to the first threshold value th1.

It thereby becomes possible to accurately detect a decrease in air pressure even when the tire air pressure detection period is short or when there is a slow leak in which the rate of decrease in air pressure is gradual.

Furthermore, a tire air pressure monitoring program according to another configuration can have: a step of acquiring tire air pressure data at each fixed detection period; a step of storing newly acquired air pressure data $P(0)$, and air pressure data $P(1)$ to $P(N)$ acquired 1 to N periods prior to the air pressure data $P(0)$ (where N is a natural number of 2 or more); a step of determining a state in which air pressure has decreased, on the basis of the air pressure data; and a step of transmitting a determination result to the external device (ECU or the like) 250.

Also, in the step of determining a state in which air pressure has decreased, when it is determined that the tire air pressure is decreasing according to a decrease value between air pressure data $P(k)$ (where k is a natural number from 1 to N) and the air pressure data $P(0)$, and all pieces of air pressure data $P(k+1)$ to $P(N)$ are greater than the sum of the air pressure data $P(0)$ and the preset second threshold value th2, it can be determined that the tire air pressure is decreasing.

It thereby becomes possible to suppress the effect of a temporary decrease in pressure such as when the tire 10 has ridden up a curb, and more accurately detect a decrease in air pressure.

Furthermore, the step of determining a state in which air pressure has decreased may be implemented such that, in a case where is determined that the tire air pressure is decreasing according to a decrease value between air pressure data $P(k)$ and the air pressure data $P(0)$, with regard to hypothetical air pressure data P' when it is assumed that air pressure has decreased by a certain proportion from the air pressure data $P(k)$ to $P(0)$, when air pressure data $P(k-1)$ to $P(1)$ and the hypothetical air pressure data $P'(k-1)$ to $P'(1)$ are compared in the same period and all are within a certain range, it is determined that the tire air pressure is decreasing.

It thereby becomes possible to prevent erroneous determination, and more accurately detect a decrease in air pressure.

Furthermore the rate of the detection period may be changed. A decrease in pressure can thereby be detected at an early stage according to the situation.

Furthermore, the value of $P(0)$ may be copied to $P(1)$ to $P(N)$ when the detection period changes. This can prevent an erroneous determination by resetting a stored value.

Furthermore, the second threshold value th2 may be changed according to the detection period.

Modified Example

A tire air pressure monitoring system S1c according to a modified example will be described with reference to FIG. 7.

Figure 7:
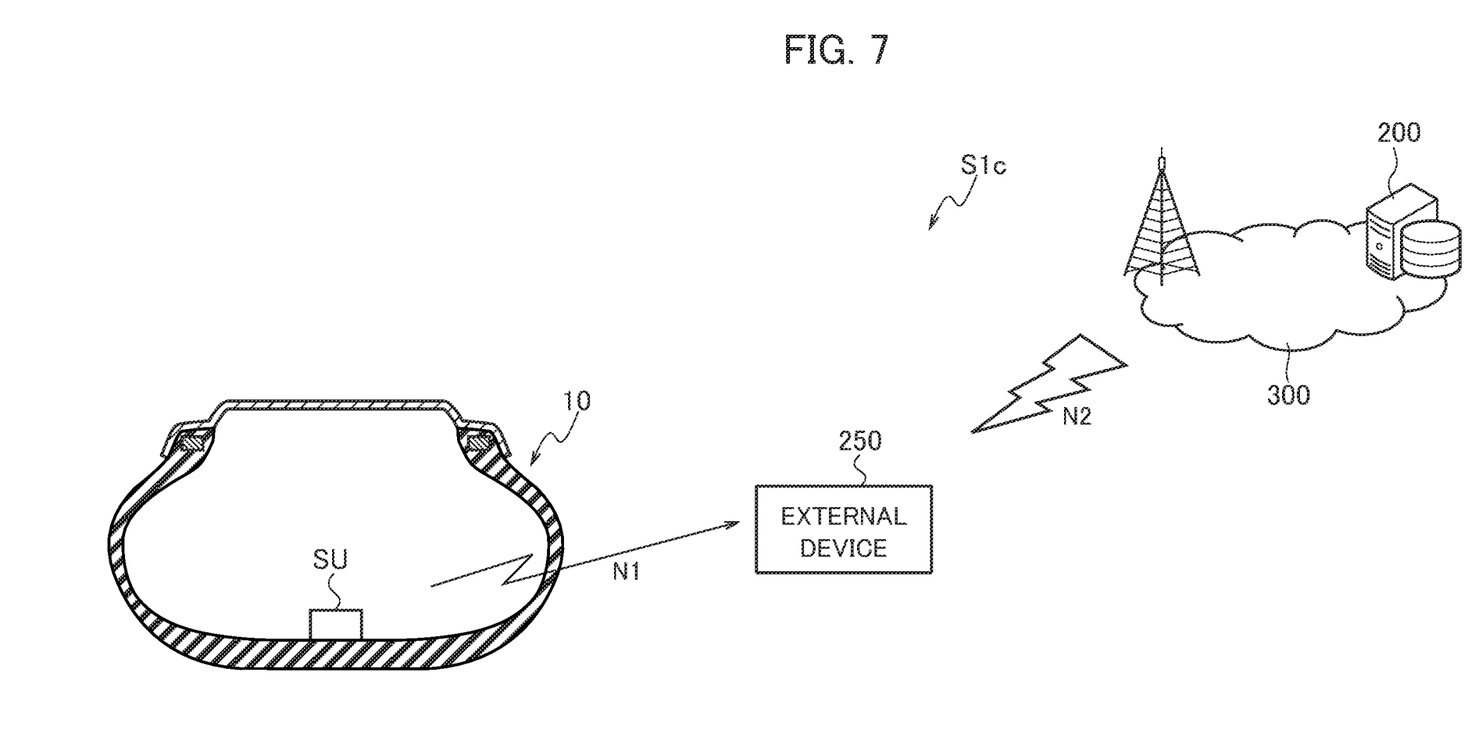
FIG. 7 is a schematic configuration diagram illustrating a modified example of a tire air pressure monitoring system according to an embodiment.

FIG. 7 is a schematic configuration diagram illustrating the tire air pressure monitoring system S1c according to the modified example.

As illustrated in FIG. 7 the tire air pressure monitoring system S1c, a configuration is adopted in which the external device (ECU or the like) 250 mounted in each vehicle communicates wirelessly with the sensor unit SU attached to the pneumatic tire 10 via the wireless line N1, and also communicates with an external cloud system 300 via a wireless line N2. Furthermore, the cloud system 300 is connected to a management server 200.

The external device of each vehicle then transmits temperature data, internal pressure data, and the like acquired from the sensor unit SU to the cloud system 300.

Furthermore, the sensor unit SU may be configured to communicate directly with the external cloud system 300.

It is thereby possible for the cloud system 300 or the management server 200 to perform some or all of the aforementioned determination processing executed by the sensor unit SU. It is thereby possible to reduce the processing load of the sensor unit SU.

The tire air pressure monitoring system and tire air pressure monitoring program of the present invention have been described above based on the illustrated embodiments; however, the present invention is not limited thereto, and the configuration of each part can be replaced with any other configurations having equivalent functions.

For example, some of the processing functions of the sensor unit SU in the embodiments herein may be mounted within the external device 250.

EXPLANATION OF THE REFERENCE NUMERALS

S1$a$, S1$b$, S1$c$ Tire air pressure monitoring system
SU Sensor unit
SN Internal pressure sensor
100 Processor
101 Data acquisition unit
102 Storage unit
103 Determination unit
150 Transmitter
151 Battery
250 External device

The invention claimed is:

1. A tire air pressure monitoring system comprising:
a data acquisition unit that acquires tire air pressure data at each fixed detection period;
a storage unit that stores newly acquired air pressure data P(0), and air pressure data P(1) to P(N) acquired 1 to N periods prior to the air pressure data P(0) (where N is a natural number of 2 or more);
a determination unit that determines a state in which air pressure has decreased, on the basis of the air pressure data; and
a communication unit that transmits a determination result of the determination unit to an external device,
wherein the determination unit compares each piece of the air pressure data P(1) to P(n) (where n is a natural number from 1 to N) with the air pressure data P(0) to calculate decrease values, compares the decrease values with a preset first threshold value, and determines that tire air pressure is decreasing when at least one decrease value is greater than or equal to the first threshold value.

2. The tire air pressure monitoring system according to claim 1,
wherein, in a case where the determination unit has determined that the tire air pressure is decreasing according to a decrease value between air pressure data P(k) and the air pressure data P(0), with regard to hypothetical air pressure data P' when it is assumed that air pressure has decreased by a certain proportion from the air pressure data P(k) to P(0), when air pressure data P(k−1) to P(1) and the hypothetical air pressure data P'(k−1) to P'(1) are compared in a same period and all are within a certain range, it is determined chat the tire air pressure is decreasing.

3. A tire air pressure monitoring program executed by a computer provided in a tire air pressure monitoring system, the program comprising:
a step of acquiring tire air pressure data at each fixed detection period;
a step of storing newly acquired air pressure data P(0), and air pressure data P(1) to P(N) acquired 1 to N periods prior to the air pressure data P(0) (where N is a natural number of 2 or more);
a step of determining a state in which air pressure has decreased, on the basis of the air pressure data; and
a step of transmitting a determination result to an external device,
wherein, in the step of determining the state in which air pressure has decreased, each piece of the air pressure data P(1) to P(n) (where n is a natural number from 1 to N) is compared with the air pressure data P(0) to calculate decrease values, the decrease values are compared with a preset first threshold value, and it is determined that tire air pressure is decreasing when at least one decrease value is greater than or equal to the first threshold value.

4. The tire air pressure monitoring program according to claim 3,
wherein, in the step of determining the state in which air pressure has decreased, in a case where it is determined that the tire air pressure is decreasing according to a decrease value between air pressure data P(k) and the air pressure data P(0), with regard to hypothetical air pressure data P' when it is assumed that air pressure has decreased by a certain proportion from the air pressure data P(k) to P(0), when air pressure data P(k−1) to P(1) and the hypothetical air pressure data P'(k−1) to P'(1) are compared in a same period and all are within a certain range, it is determined that the tire air pressure is decreasing.

* * * * *